United States Patent
Touret et al.

(10) Patent No.: US 10,346,682 B2
(45) Date of Patent: Jul. 9, 2019

(54) METHOD OF AUTHENTICATING DOCUMENTS BY MEANS OF A MOBILE TELECOMMUNICATIONS TERMINAL

(71) Applicant: SAFRAN IDENTITY & SECURITY, Issy les Moulineaux (FR)

(72) Inventors: Olivier Touret, Issy les Moulineaux (FR); Pierre Chastel, Issy les Moulineaux (FR)

(73) Assignee: IDEMIA IDENTITY & SECURITY, Issy les Moulineaux (FR)

( * ) Notice: Subject to any disclaimer, the term of this patent is extended or adjusted under 35 U.S.C. 154(b) by 0 days.

(21) Appl. No.: 15/637,822

(22) Filed: Jun. 29, 2017

(65) Prior Publication Data

US 2018/0005027 A1   Jan. 4, 2018

(30) Foreign Application Priority Data

Jun. 29, 2016  (FR) .................................. 16 56123

(51) Int. Cl.
G06K 9/00    (2006.01)
G06K 9/20    (2006.01)
G06K 9/22    (2006.01)

(52) U.S. Cl.
CPC ....... *G06K 9/00442* (2013.01); *G06K 9/2063* (2013.01); *G06K 9/228* (2013.01)

(58) Field of Classification Search
None
See application file for complete search history.

(56) References Cited

U.S. PATENT DOCUMENTS

| 7,366,337 B2* | 4/2008 | Kortum ..................... G07D 7/20 382/135 |
| 8,019,115 B2* | 9/2011 | Alasia ..................... G07D 7/128 380/232 |
| 9,153,005 B2* | 10/2015 | Tremolada ........... G07D 7/0006 |
| 2011/0211760 A1 | 9/2011 | Boncyk et al. |
| 2013/0287265 A1 | 10/2013 | Nepomniachtchi et al. |
| 2014/0044337 A1 | 2/2014 | Rutz et al. |
| 2015/0078671 A1 | 3/2015 | Van Deventer et al. |

FOREIGN PATENT DOCUMENTS

KR    20150071063 A    6/2015
WO    WO2014059439 A1  4/2014

* cited by examiner

*Primary Examiner* — K. Wong

(74) *Attorney, Agent, or Firm* — Muncy, Geissler, Olds & Lowe, P.C.

(57) ABSTRACT

A method for authenticating at least one document having a predetermined format and carrying at least one security pattern of appearance that varies as a function of an angle of observation, the method comprising the steps of: capturing at least one image of the document; determining a camera angle by comparing geometric characteristics detected in the document and stored predetermined geometric characteristics; deducing an expected appearance for the security pattern; comparing the expected appearance with an appearance detected in the image of the document; and declaring the document authentic when the expected appearance matches the detected appearance.

9 Claims, 1 Drawing Sheet

METHOD OF AUTHENTICATING DOCUMENTS BY MEANS OF A MOBILE TELECOMMUNICATIONS TERMINAL

The present invention relates to authenticating documents of the paper type, such as passports and identity cards.

STATE OF THE ART

In order to attempt to render documents counterfeit-proof, it is known to arrange security patterns on such documents, including in particular:
- patterns of a first type, having fine detail and/or graphic complexity that make(s) reproduction difficult; and
- patterns of a second type, having an appearance (shape, intensity, color, . . . ) that varies as a function of observation conditions, i.e. the inclination at which light rays hit the pattern (illumination angle parameters) and of the position of the observer relative to the pattern (viewing angle parameters).

Authentication of the document relies on the correct visual perception of patterns of the first type and on the correct visual perception of the appearance of patterns of the second type, taking into account real observation conditions.

Automatic systems are known that comprise a frame that carries a processing unit connected to at least one image sensor and a lighting device. The frame defines a housing for receiving the document facing the image sensor and the lighting member in such a manner as to ensure identical and predetermined positioning of documents relative to the sensor and the lighting member. The expected appearance of security patterns of the second type is thus known, which authorizes automated authentication.

Object of the Invention

An object of the invention is to provide means making it possible to authenticate a document automatically when the position of the document is not accurately imposed relative to the image sensor and possibly when the illumination angle of the document is not known either.

BRIEF SUMMARY OF THE INVENTION

To this end, the invention provides a method for authenticating at least one document having a predetermined format and carrying at least one security pattern of appearance that varies as a function of observation angle parameters. The method is implemented by means of a mobile telecommunications terminal having an image sensor, and by means of a processing unit connected to a memory containing predetermined geometric characteristics of the document. The method comprises the steps of capturing at least one image of the document by means of the image sensor and of transmitting it to the processing unit, and subsequent steps, performed by the processing unit, of:
- determining camera angle parameters by comparing geometric characteristics detected in the image of the document with stored predetermined geometric characteristics;
- deducing an expected appearance for the security pattern;
- comparing the expected appearance with an appearance of the security pattern as detected in the image of the document; and
- declaring the document authentic when the expected appearance matches the detected appearance.

Thus, the position of the image sensor relative to the document is calculated and at least one expected appearance for the pattern can be deduced from the observation angle parameters resulting from said position. Under such circumstances, precise positioning of the mobile telecommunications terminal relative to the document is not necessary during image capture.

The invention also provides a mobile telecommunications terminal arranged to implement the method.

Other characteristics and advantages of the invention appear on reading the following description of a particular, non-limiting embodiment of the invention.

BRIEF DESCRIPTION OF THE FIGURES

Reference is made to the accompanying drawing, in which.

DETAILED DESCRIPTION OF THE INVENTION

Figure 1:
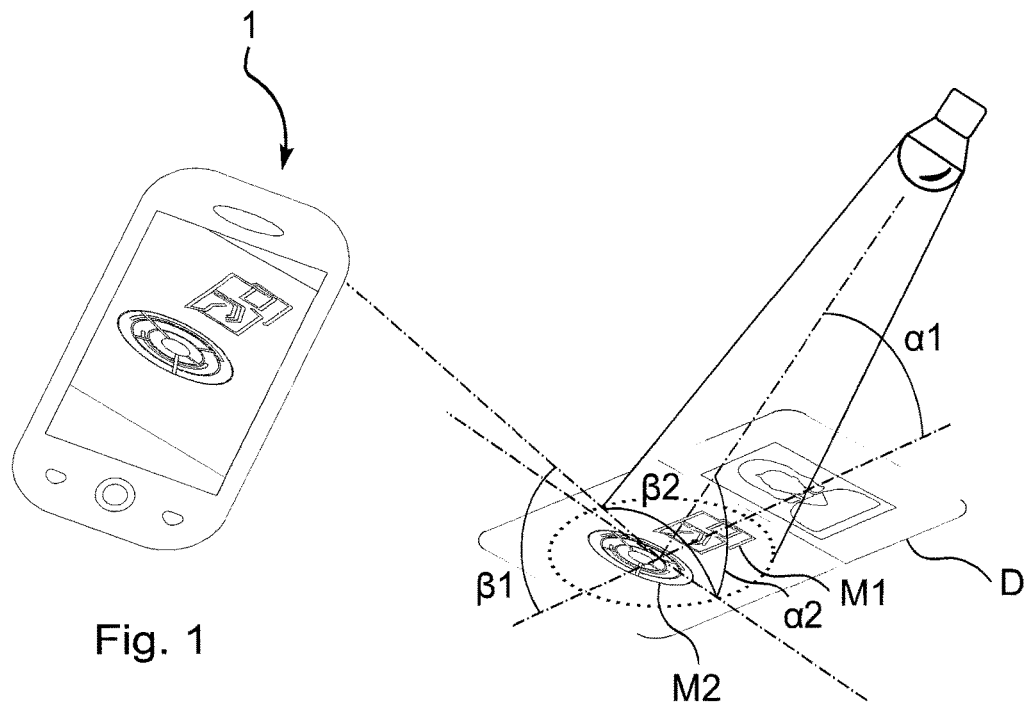
FIG. 1 is a diagram showing an image of a document being captured by the terminal.

With reference to FIG. 1, the invention is described below with application to authenticating passport type documents D of rectangular shape. At least one portion of the document includes security patterns, which, in this embodiment, comprise:
- a pattern M1 of a first type, having fine detail and/or graphic complexity that make(s) reproduction difficult, the pattern M1 being in this embodiment constituted of a collection of very fine lines;
- a pattern M2 of a second type, having an appearance (shape, intensity, color, . . . ) that varies as a function of observation conditions, i.e. angle parameters representative both of the inclination of light rays hitting the pattern M2 (shown by illumination angles $\alpha 1$, $\alpha 2$ in FIG. 1) and also of the position of the observer relative to the pattern M2 (shown by viewing angles $\beta 1$, $\beta 2$).

The patterns M1 and M2 are made in a manner that is known per se.

Figure 2:
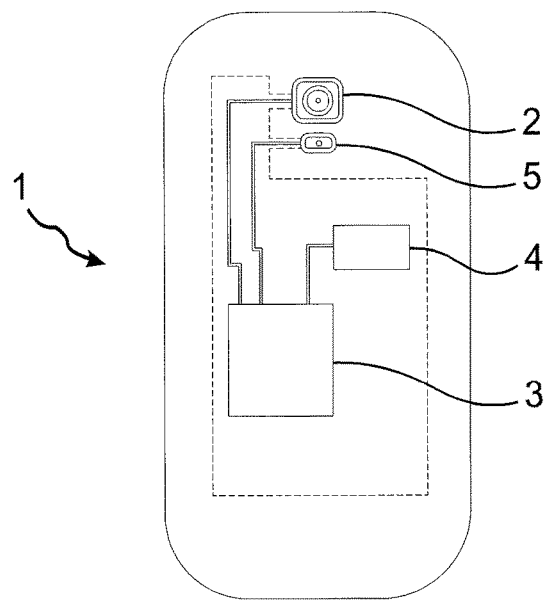
FIG. 2 is a diagram showing a mobile terminal for use in implementing the method of the invention.

Also with reference to FIG. 2, the invention is implemented by means of a mobile telecommunications terminal, generally given reference 1, in this embodiment a mobile telephone of the smartphone type, having an image sensor 2 that is sensitive to rays of the visible spectrum, illumination means 5, in this embodiment a light-emitting diode (LED), and a processing unit 3 connected to the image sensor 2, to the illumination means 5, and to a memory 4 containing predetermined geometric characteristics of the document D. The processing unit 3 is an electronic circuit comprising a processor capable of executing computer programs stored in the memory 4.

One of the computer programs is a program for authenticating a document D by implementing the authentication method of the invention.

The authentication method comprises the steps of:
- capturing, by means of the image sensor 2, at least one image of the portion of the document D carrying the patterns M1, M2; and
- transmitting the image to the processing unit 3.

The processing unit 3 compares the pattern M1 detected in the image with a representation of the pattern M1 stored in memory 4. If the pattern M1 detected and its representation as modified match, then the program continues.

The processing unit 3 is programmed to determine the camera angle β by comparing geometric characteristics detected in the image of the document D with the predetermined geometric characteristics stored in the memory 4. More precisely, the processing unit 3 implements an image processing program in order to detect in the image the outlines of the document and various elements such as the patterns M1, M2, a photograph, the machine-readable zone (MRZ), . . . . Using the deformation of the outline (which is correspondingly more trapezoidal the lower the camera angle), the processing unit 3 calculates the camera angle parameters corresponding to the viewing angle position (defines the viewing angle parameters β1, β2).

The processing unit 3 interrogates a database that is hosted in the memory 4 and that correlates camera angles with expected appearances and, for each camera angle, expected appearances and illumination angles. The processing unit 3 searches the database for an expected appearance of the security pattern M2 as a function of the viewing angle β. Since the pattern M2 has an appearance that varies as a function both of the illumination angle α and of the viewing angle β, and since only the viewing angle is known, the processing unit 3 identifies a plurality of expected appearances.

The processing unit 3 thus compares the expected appearances with the appearance of the security pattern M2 as detected in the image of the document D and declares the document D authentic when one of the expected appearances matches the detected appearance.

In a variant, it is possible to capture a plurality of images with different camera angles. This makes it possible to have a plurality of appearances, each depending on a viewing angle and on an illumination angle. This reinforces authentication.

Naturally, the invention is not limited to the embodiments described but encompasses any variant coming within the ambit of the invention as defined by the claims.

In particular, the document need only include one or more patterns M2.

The appearance of the security pattern might vary only as a function of the viewing angle.

The image may be captured while the illumination means are activated thus making it possible to impose illumination angle parameters that are very close to the camera angle parameters.

In a variant, the method may comprise the step of capturing one image with the illumination means activated and one image with the illumination means deactivated. This provides two appearances of the pattern M2.

The telecommunications terminal may have a structure that is different to that described. The terminal may be a mobile telephone, a multimedia tablet, a portable computer, . . . .

The processing unit and the memory need not be incorporated in the mobile telecommunications terminal, instead being accessible via a network such as the Internet.

Comparison may be performed in a separate server, outside the terminal.

In an implementation, the expected appearances recorded in the database are stored for discrete combinations of viewing and illumination angle parameters: the appearance detected with the determined viewing angle parameters is compared with the expected appearances corresponding to the angle parameters that are the closest match in the database (for angle parameters corresponding to a viewing angle, there are a plurality of expected appearances for the various illumination angle parameters). Each comparison provides a score that is compared with thresholds. Naturally, other ways of proceeding may be envisaged.

The invention claimed is:

1. A method for authenticating at least one document having a predetermined format and carrying at least one security pattern of appearance that varies as a function of observation angle parameters, the method being implemented by means of a mobile telecommunications terminal having an image sensor, and by means of a processing unit connected to a memory containing predetermined geometric characteristics of the document, the method comprising the steps of capturing at least one image of the document by means of the image sensor and of transmitting it to the processing unit, and subsequent steps, performed by the processing unit, of:
    determining image sensor angle parameters by comparing geometric characteristics detected in the image of the document with stored predetermined geometric characteristics;
    deducing from the image sensor angle parameters thus determined an expected appearance for the security pattern;
    comparing the expected appearance with an appearance of the security pattern as detected in the image of the document; and
    declaring the document authentic when the expected appearance matches the detected appearance.

2. The method according to claim 1, the telecommunications terminal including illumination means, wherein the image is captured while the illumination means are activated.

3. The method according to claim 2, comprising the step of capturing one image with the illumination means activated and one image with the illumination means deactivated.

4. The method according to claim 1, wherein the expected appearance is deduced using a database correlating image sensor angle parameters with expected appearances.

5. The method according to claim 1, wherein the database also correlates expected appearances with illumination angle parameters, for predetermined image sensor angle parameters.

6. The method according to claim 1, comprising the step of capturing a plurality of images with different image sensor angle parameters.

7. The method according to claim 1, wherein the processing unit and the memory are incorporated in the mobile telecommunications terminal.

8. The method according to claim 1, wherein the comparison is performed outside the terminal.

9. The mobile terminal having an image sensor and a processing unit connected to a memory containing geometric characteristics of the document, the processing unit being programmed to implement the method according to claim 1.

* * * * *